United States Patent

Ji et al.

[11] Patent Number: 6,017,382
[45] Date of Patent: Jan. 25, 2000

[54] METHOD OF PROCESSING SEMICONDUCTOR MANUFACTURING EXHAUST GASES

[75] Inventors: Wenchang Ji, Doylestown, Pa.; Dongmin Shen, Chatham, N.J.; Ravi Jain, Bridgewater, N.J.; Arthur I. Shirley, Piscataway, N.J.; Atul M. Athalye, Chatham, N.J.; Piotr J. Sadkowski, Bridgewater, N.J.

[73] Assignee: The BOC Group, Inc., New Providence, N.J.

[21] Appl. No.: 09/050,259

[22] Filed: Mar. 30, 1998

[51] Int. Cl.[7] ................................................ B01D 53/047
[52] U.S. Cl. ................................ 95/103; 95/119; 95/121; 95/130; 95/131; 95/138; 95/142
[58] Field of Search ..................... 95/96–98, 100–105, 95/117–119, 121, 122, 130, 131, 138, 142, 902

[56] References Cited

U.S. PATENT DOCUMENTS

| | | | |
|---|---|---|---|
| 3,282,028 | 11/1966 | Berlin | 95/138 X |
| 4,144,037 | 3/1979 | Armond et al. | 95/130 X |
| 4,348,213 | 9/1982 | Armond | 95/138 X |
| 4,539,019 | 9/1985 | Koch | 95/130 X |
| 5,069,690 | 12/1991 | Henderson et al. | 95/902 X |
| 5,261,948 | 11/1993 | Foley et al. | 95/142 |
| 5,395,427 | 3/1995 | Kumar et al. | 95/117 X |
| 5,451,248 | 9/1995 | Sadkowski et al. | 95/138 X |
| 5,529,610 | 6/1996 | Watson et al. | 95/122 X |
| 5,622,682 | 4/1997 | Tom | 95/142 X |
| 5,674,311 | 10/1997 | Notaro et al. | 95/130 X |
| 5,759,237 | 6/1998 | Li et al. | 95/131 X |
| 5,814,127 | 9/1998 | Li | 95/131 X |
| 5,833,738 | 11/1998 | Carrea et al. | 95/138 X |

FOREIGN PATENT DOCUMENTS

| | | |
|---|---|---|
| 0 754 487 A1 | 1/1997 | European Pat. Off. . |
| 0 819 779 A1 | 1/1998 | European Pat. Off. . |

*Primary Examiner*—Robert Spitzer
*Attorney, Agent, or Firm*—David M. Rosenblum; Salvatore P. Pace

[57] ABSTRACT

A method of processing semiconductor manufacturing exhaust gases for recovering at least hexafluoroethane in which a feed stream composed of the exhaust gases is passed through an adsorbent bed selected to adsorb oxygen, and also nitrogen if present, but not to appreciably adsorb the hexafluoroethane. As a result, a product stream, discharged from the adsorbent bed, has a higher concentration of hexafluoroethane than in the feed stream. In one embodiment, only a single adsorbent such as carbon molecular sieve is provided to adsorb the oxygen or a modified 4A zeolite could be used to adsorb both oxygen and nitrogen. When nitrogen is a potential constituent, layers of carbon molecular sieve and zeolite are provided to adsorb the oxygen and then the nitrogen, respectively. A third adsorbent, preferably 5A zeolite may be provided in addition to the foregoing two adsorbents to also adsorb any carbon tetrafluoride produced as a by-product.

13 Claims, 1 Drawing Sheet

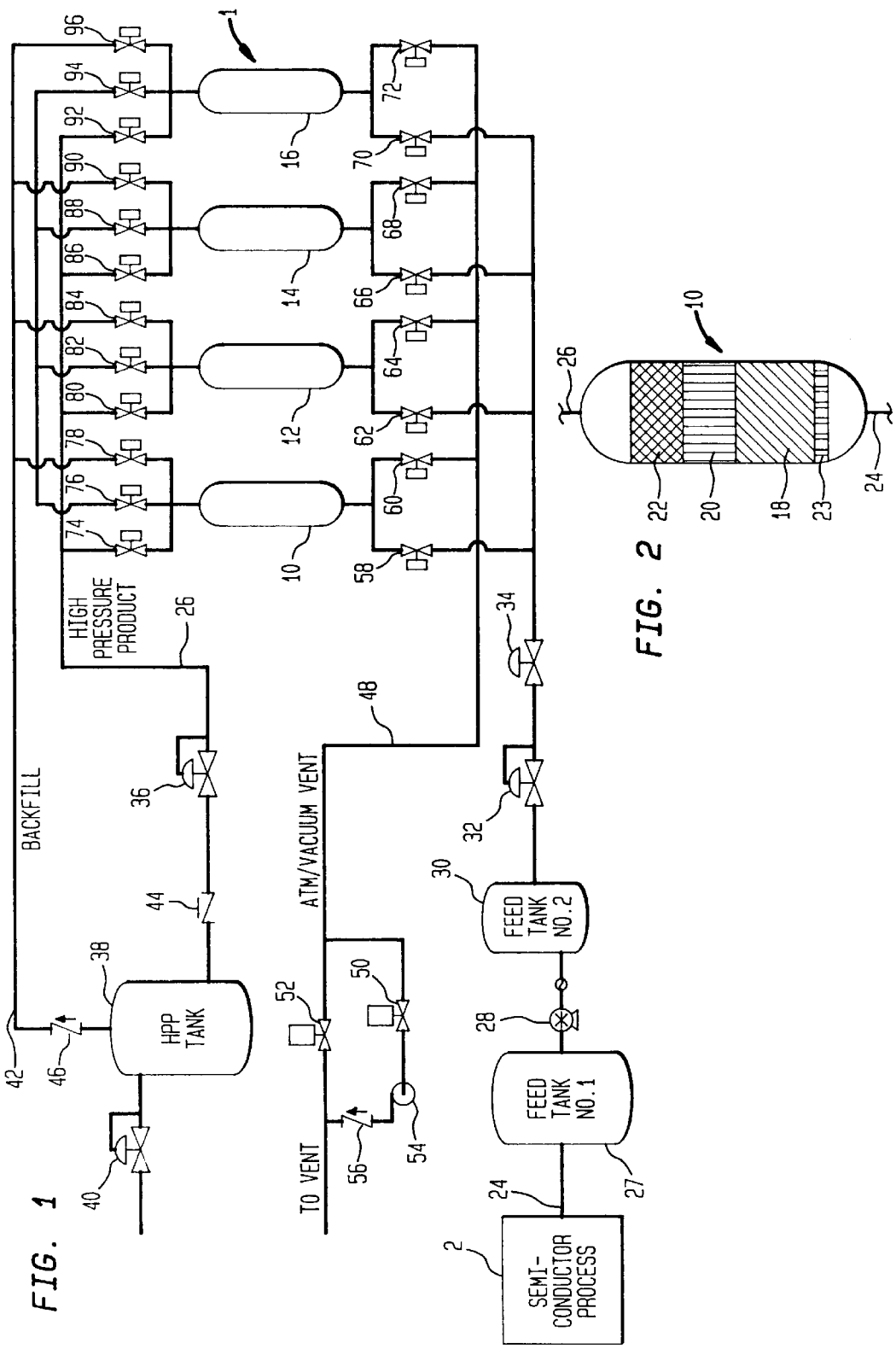

METHOD OF PROCESSING SEMICONDUCTOR MANUFACTURING EXHAUST GASES

BACKGROUND OF THE INVENTION

The present invention relates to a method of processing exhaust gases produced by a semiconductor manufacturing process in which at least hexafluoroethane is concentrated for subsequent recovery by adsorbing oxygen or both oxygen and nitrogen present within the off-gases.

Perfluorocarbons, such as hexafluoroethane ($C_2F_6$), are used in the semiconductor industry for cleaning purposes. Hexafluoroethane is fed with oxygen, generally in equal parts by volume, into a semiconductor fabrication chamber. Carbon tetrafluoride ($CF_4$) is produced as a by-product. Since nitrogen is used as a purge gas to vacuum pumps, the effluent or exhaust gases from the chamber can contain carbon tetrafluoride, hexafluoroethane, oxygen, and nitrogen. Additionally unconsumed etchants such as nitrogen trifluoride, can also be present. Since perfluorocarbons, such as the carbon tetrafluoride or hexafluoroethane, present an environmental hazard as contributing to greenhouse effect, they cannot be discharged to the atmosphere and must be recovered or abated. With respect to hexafluoroethane, recovery presents a more attractive option than abatement because the recovered hexafluoroethane can be recycled.

Commonly, the effluent or off-gas is recovered from a chamber by pumping with a vacuum pump. In order to aid in the pumping operation and in some cases to prevent potential flammable substances from concentrating, the exhaust gases are diluted with nitrogen. Since the effluent also contains acid gases and other undesirable species, typically the exhaust gases are scrubbed before any further treatment. The perfluorocarbon content of the resultant feed stream is then recovered by adsorption and membrane techniques. For instance, in EP 0754487, perfluorocarbons are recovered by passing an effluent stream into a membrane unit selected such that the perfluorocarbon content forms the non-permeate stream while the carrier gas content permeates the membrane and thus forms the permeate stream. However, at low concentrations the membrane area required and the compressor requirements may not be cost effective. In known adsorption techniques, the perfluorocarbons are recovered at low pressure. A problem with adsorption is that the resultant product stream, must be recompressed before further usage or treatment.

In a recent patent EP 819779, a multi-port valve is positioned between the scrubber and one or more treatment chambers so that etchant streams may be diluted and then recovered or abated and cleaning streams that contain the perfluorocarbons of interest here are segregated from other process gas streams and then routed directly for treatment without any dilution or with slight dilution with added nitrogen to serve as a ballast gas to promote the pumping of the off-gas. As such, it is contemplated in this patent that the resultant feed to be treated has a higher concentration of hexafluoroethane (as well as other perfluorocarbons) than is contemplated in prior art methods.

As will be discussed, the present invention has direct application to treatment apparatus and methods in which a feed to be treated is generated in the manner contemplated by EP 819779 and further, has the advantage for any treatment in that the recovery of the hexafluoroethane is not conducted at reduced pressure.

SUMMARY OF THE INVENTION

In accordance with the present invention a method of processing semiconductor manufacturing exhaust gases for recovering at least hexafluoroethane is provided in which a feed stream originating from a semiconductor processing chamber is introduced into an adsorbent bed. The feed stream is made-up of said semiconductor manufacturing exhaust gases and comprises oxygen and said hexafluoroethane. A product stream is discharged from said adsorbent bed. The adsorbent bed contains at least a first adsorbent selected to at least adsorb the oxygen and to substantially not adsorb the hexafluoroethane such that said product stream has a higher concentration of the hexafluoroethane than said feed stream. As will be discussed, a second adsorbent may also be provided that is specific to nitrogen. A third adsorbent may be provided to adsorb carbon tetrafluoride and alumina or silica gel layers can be used to adsorb any moisture. If alumina is used, then carbon dioxide will be adsorbed as well. In any embodiment, it is not the hexafluoroethane that is adsorbed and as such may be further treated or utilized without or with a minimum of further compression.

BRIEF DESCRIPTION OF THE DRAWINGS

While the specification concludes with claims distinctly pointing out the subject matter that Applicants' regard as their invention, it is believed that the invention will be better understood when taken in connection with the accompanying drawings in which:

FIG. 1 is a schematic view of an apparatus for carrying out a method in accordance with the present invention; and FIG. 2 is a schematic view of an adsorbent bed for carrying out a method in accordance with the present invention.

DETAILED DESCRIPTION

With reference to FIG. 1, a pressure swing adsorption apparatus 1 for carrying out a method in accordance with the present invention is illustrated. As will be discussed, in regeneration of the adsorbent, an evacuation step is effectuated in which adsorbent beds are evacuated under vacuum. As such, apparatus 1 could be referred to by one skilled in the art as a vacuum swing adsorption system. The present invention is not, however, limited to adsorption systems that have an evacuation step during bed regeneration. Thus, the term "pressure swing adsorption" as used herein and in the claims means any system in which bed pressure swings and thus, not only includes systems in which beds are regenerated at positive pressure, but also systems including an evacuation step and/or systems that also use a temperature swing during bed regeneration.

In pressure swing adsorption system 1, beds 10, 12, 14 and 16 are utilized to effect the adsorption of nitrogen and oxygen from the feed mixture to concentrate perfluoroethane within a product stream. With reference to FIG. 2, adsorbent bed 10 is illustrated as an exemple of adsorbent beds 10, 12, 14 and 16. Adsorbent bed 10 contains four layers of adsorbent, namely, a first adsorbent 18, a second adsorbent 20, and a third adsorbent 22 and optionally a layer 23 of silica gel or alumina principally to adsorb any moisture. Adsorbent bed 10 is utilized so that a feed stream 24 composed of the semiconductor processing exhaust gases enters a bottom region of adsorbent bed 10 and is discharged as a product stream 26.

It is to be noted though that the designation of the adsorbents as "first" and "second" is for convenience only and does not necessarily connote that the feed stream 24 passes through the first adsorbent and then the second adsorbent. The placement of the adsorbents within an adsorbent bed would depend upon the concentration of oxygen within the adsorbent. For instance, if oxygen is a very dilute constituent of the stream to be processed, second adsorbent 20 could be positioned so as to act upstream of first adsorbent 18. In most applications, however, as illustrated, first adsorbent 18 would be positioned upstream of second adsorbent 20.

First and second adsorbents 18 and 20 are preferably of the type that exclude perfluorocarbons such as hexafluoroethane by having average pore sizes less than the kinetic diameter of the hexafluoroethane. Their average pore sizes should be large enough so that oxygen and nitrogen are both adsorbed. First adsorbent 18 is selected to have a comparable capacity to adsorb oxygen and nitrogen but to have lower rate of adsorption for nitrogen than for oxygen. As such, adsorbent 18 will preferentially adsorb oxygen from feed stream 24. Second adsorbent 20 functions to adsorb the nitrogen in the feed and any oxygen not adsorbed within first adsorbent 18. As such, second adsorbent 20 is selected to adsorb oxygen and nitrogen at comparable rates, but to have a higher capacity for nitrogen. Furthermore, as between adsorbents, first adsorbent 18 is selected to have a higher capacity to adsorb oxygen than second adsorbent 20. However the rates of oxygen adsorption for first and second adsorbents 18 and 20 should also be comparable. Preferable adsorbent 18 can be a carbon molecular sieve adsorbent having a mean pore size of about 4 angstroms. Second adsorbent 20 can be a 4A zeolite, as well as mixed ion exchange forms thereof. It is to be noted that the term "comparable" as used herein and in the claims means the same order of magnitude.

Third adsorbent 22 can be a 5A zeolite adsorbent or a carbon molecular sieve to adsorb carbon tetrafluoride and other perfluorocarbons having a smaller kinetic diameter, e.g. nitrogen trifluoride.

By way of an example, a feed stream 24 compressed to a pressure of about 294 kPa and containing by volume, about 50% oxygen, about 10% nitrogen, and about 40% hexafluoroethane, after passing through adsorbent bed 10, having layers of carbon molecular sieve and a 4A zeolite such as has been described above, would produce a product stream 26 having about 95% by volume hexafluoroethane. Product stream 26 would then be further processed by known techniques such as cryogenic distillation or a temperature swing adsorption unit to produce a final product of 99.999% purity that could be recycled and re-used to clean a processing chamber.

Other embodiments of the present invention are possible. For instance, a single adsorbent composed of 4A zeolite could be used in place of first and second adsorbents 18 and 20. This might prove to be a disadvantage in a semiconductor fabrication facility because the size of each of adsorbent beds 10, 12, 14, and 16 would increase. Furthermore, third adsorbent 22 might also be deleted. Also, both oxygen and nitrogen could be adsorbed by a single adsorbent such as modified 4A zeolite with pore sizes of between about 4 and about 5 angstroms, Chabazite, Ca-Chabazite, Na-Mordenite, Ca-Mordenites, Clinoptilolite, ion-exchanged Clinoptilolite, etc. In such case, carbon tetrafluoride and other perfluorocarbons would have to be separated from product stream 26 to produce hexafluoroethane of the requisite purity. If moisture is removed prior to pressure swing adsorption apparatus 1, layer 23 of moisture adsorbing material could be dispensed with. Furthermore a single adsorbent of 5A zeolite could be used in place of first and second adsorbents 18 and 20. In such case, again bed size would increase over the illustrated embodiment. However, such bed would also help remove the carbon tetrafluoride and other smaller kinetic diameter constituents.

The thickness of the layers of first, second and third adsorbents 18, 20 and 22 will depend upon the composition of the feed. Assuming a common feed seen in semiconductor fabrication facilities that contains perfluorocarbons in a range of between about 40% and about 50%, oxygen in a range of between about 35% and about 60% oxygen, and nitrogen either not present or ranging as high as about 25%, there can be about three times as much carbon molecular sieve material for first adsorbent 18 than 4A zeolite used in second adsorbent 20.

Turning to the illustrated process (which would work for any of the embodiments discussed above), a feed stream 24 which is the effluent or exhaust gases from a semiconductor process 2 is fed to a feed tank 27 operating at the pressure of the semiconductor process. It is to be noted that although not illustrated, feed stream 24 could be a stream segregated in the manner of the teachings contained within EP 819779 and further could be pretreated as necessary by known scrubbing techniques. In this regard, feed stream 24 could be formed by vacuum pumping a process chamber with the use of a three-way valve. The valve would be connected to the illustrated apparatus 1 so that when cleaning a process chamber, the valve would be switched to apparatus 1 and a concentrated feed stream 24 would be formed. In this regard, such feed stream 24 could have a hexafluoroethane concentration of between about 10 vol. percent and about 60 vol. percent or more preferably between about 30 and about 40 vol. Percent. This having been said, the present invention has equal applicability to treating streams having a more dilute concentration of hexafluoroethane.

Feed stream 24 is compressed by a compressor 28 to the operating pressure of the process being carried out in pressure swing adsorption apparatus 1, preferably, about 294 kPa. The now pressurized feed stream 24 passes into a secondary feed tank 30 having a pressure regulated by pressure regulation valve 32. A proportional valve 34 can be provided to regulate the flow within apparatus 1. The pressure of product stream 26 is controlled by pressure regulator 36. Product stream 26 is then sent to a product tank 38 in which pressure is regulated by a pressure regulator 40. A backfill stream 42 can be removed from product tank 38 for improving product purity. Check valves 44 and 46 prevent backflow of product stream 26 and backfill stream 42, respectively.

A vacuum/vent stream 48 is produced during regeneration of adsorbent beds 10, 12, 14 and 16. When valve 50 is closed and valve 52 is opened, vacuum/vent stream 48 vents to atmosphere. When valve 52 is closed and valve 50 is opened, a vacuum pump 54 acts to evacuate adsorbent beds 10, 12, 14 and 16 under vacuum conditions. A check valve 56 is provided to prevent backflow to vacuum pump 54. Preferably, vacuum pump 54 is left running during the entire cycle.

The following chart is provided to illustrate the operation of apparatus 1. In the chart, the numbers in parenthesis represent the valves that are open during the relevant step. All other valves are assumed to be closed. In this regard, the cycle steps are controlled by valves 58 through 96 as well as other control valves previously mentioned. The terms, "DE" and "IN" with respect to pressure equalization steps indicate that the pressure of a particular bed is either decreasing or increasing. Three columns of possible time periods for each of the steps (designated as "t(s)" and meaning time in seconds) are given as alternatives.

| Step | Bed 10 | Bed 12 | Bed 14 | Bed 16 | t(s) | t(s) | t(s) |
|---|---|---|---|---|---|---|---|
| 1 | PRODUCTION (58, 74) | EQUALIZE(IN) (82) | VENT (68, 52) | EQUALIZE(DE) (94) | 10 | 10 | 10 |
| 2 | PRODUCTION (58, 74) | EQUALIZE(IN) (82) | EVACUATION (68, 50) | EQUALIZE(DE) (94) | 20 | 40 | 100 |
| 3 | PRODUCTION (58, 74) | BACKFILL (84) | EQUALIZE(IN) (88) | EQUALIZE(DE) (94) | 10 | 10 | 10 |
| 4 | EQUALIZE(DE) (76) | PRODUCTION (62, 80) | EQUALIZE(IN) (88) | VENT (72, 52) | 10 | 10 | 10 |
| 5 | EQUALIZE(DE) (76) | PRODUCTION (62, 80) | EQUALIZE(IN) (88) | EVACUATION (72, 50) | 20 | 40 | 100 |
| 6 | EQUALIZE(DE) (76) | PRODUCTION (62, 80) | BACKFILL (90) | EQUALIZE(IN) (94) | 10 | 10 | 10 |
| 7 | VENT (60, 52) | EQUALIZE(DE) (82) | PRODUCTION (66, 86) | EQUALIZE(IN) (94) | 10 | 10 | 10 |
| 8 | EVACUATION (60, 50) | EQUALIZE(DE) (82) | PRODUCTION (66, 86) | EQUALIZE(IN) (94) | 20 | 40 | 100 |
| 9 | EQUALIZE(IN) (76) | EQUALIZE(DE) (82) | PRODUCTION (66, 86) | BACKFILL (96) | 10 | 10 | 10 |
| 10 | EQUALIZE(IN) (76) | VENT (64, 52) | EQUALIZE(DE) (88) | PRODUCTION (70, 92) | 10 | 10 | 10 |
| 11 | EQUALIZE(IN) (76) | EVACUATION (64, 50) | EQUALIZE(DE) (88) | PRODUCTION (70, 92) | 20 | 40 | 100 |
| 12 | BACKFILL (78) | EQUALIZE(IN) (82) | EQUALIZE(DE) (88) | PRODUCTION (70, 92) | 10 | 10 | 10 |
| | | | | Production Time(s) | 40 | 70 | 120 |
| | | | | Cycle Time (min) | 2.7 | 4 | 8 |

With reference to the chart, during the first step, valves 58 and 74 are set in open positions so that bed 10 can function in a production mode and thus produce product stream 26. Valves 82 and 94 are also open to permit a pressure equalization step between 12 and 16. As indicated the pressure decreases in bed 16 and increases in bed 12, 16 having previously functioned in production mode. This helps to repressurize bed while initiating desorption of adsorbents contained within bed 16. Bed 14 is functioning in a vent mode of operation and as such, valve 68 is open along with valve 52 to allow bed 14 to vent to atmosphere. Oxygen and nitrogen further desorbs from bed 14.

In the next step, bed 14 undergoes evacuation. This is effectuated by now opening valve 50 and closing valve 52.

In order to bring bed 12 on line, in the third step, bed 12 is backfilled with backfill stream 42 by opening valve 84. This allows bed 12 to be brought up to pressure.

In step 4, bed 12 now becomes a producing bed by opening valve 62 and valve 80. In order to regenerate bed 10, valve 76 is opened along with valve 88. This causes bed 10 to depressurize into bed 14. Valve 72 is opened along with valve 52 to allow bed 16 to vent to atmosphere. In step 5, bed 16 is evacuated by simply opening valve 50 while closing valve 52.

In step 6, bed 14 is brought up into operating pressure by the backfill step by opening valve 90. At the same time, valve 94 is opened and valve 76 is opened to allow bed 10 to equalize with bed 16.

Step 7, bed 10 is vented by opening valves 60 and 52 while closing valve 50. Now bed 12 is equalized with bed 16 by opening valve 82. At the same time, bed 14 is now in a production mode of operation and as such, valve 66 is opened and valve 86 is opened. Step 8, bed 10 is subjected to evacuation by opening valve 50 and closing valve 52.

In step 9, valves 76 and 82 are opened to allow pressure in bed 12 to equalize the pressure in bed 10. Bed 16, prior to being brought back on-line, it is backfilled with backfill stream 42 by opening valve 96.

During step 10, bed 14 is pressure equalized with bed 10 by opening valve 88. Bed 12 is vented by opening valve 64 and valve 52. Now bed 16 is the producing bed and as such, valves 70 and 92 are opened.

Step 11 is conducted with a view to bringing bed 10 back on line. This is initiated, by pressure equilizing beds 10 and 14 by opening valve 88. Bed 12 is evacuated by opening valve 64, closing valve 52 and opening valve 50.

In step 12, bed 10 is backfilled with backfill stream 42 by opening valve 78. Bed 14 is pressure equalized with bed 12 by opening valve 82 next step is a repetition of step 1. After step 12, the cycle repeats with step 1.

Although the four-bed layout of apparatus 1 is preferred, three-bed and even two-bed PSA systems are possible. In a three-bed system, the difference would be only one equalization step in which pressure was decreased in the bed and thus only one pressure equalization step at which pressure were increased in the bed. Although not illustrated, the vent step could be a vent to a further pressure swing adsorption system in the manner of pressure swing adsorption system 1 in order to increase production yield. Thus the vent stream 48 would form a feed stream to another apparatus. Additionally, although not illustrated vent stream 48 could be recycled and used to form part of the make-up for feed stream 24. Other process steps such as bed regeneration by purging can also be used.

While the present invention has been discussed with reference to a preferred embodiment, as will occur to those skilled in the art, numerous changes, additions and omissions may be made without departing from the spirit and the scope of the present invention.

What is claimed is:

1. A method of processing semiconductor manufacturing exhaust gases for recovering at least hexafluoroethane, said method comprising:

introducing a feed stream originating from a semiconductor processing chamber to an adsorbent bed, said feed stream made-up of said semiconductor manufacturing exhaust gases and comprising oxygen, nitrogen, and said hexafluoroethane; and discharging a product stream from said adsorbent bed;

the adsorbent bed containing at least a first adsorbent selected to adsorb at least said oxygen and said nitrogen and to substantially not adsorb said hexafluoroethane such that said product stream has a higher concentration of said hexafluoroethane than said feed stream.

2. The method of claim 1, wherein said first adsorbent has a pore size greater than said oxygen and less than a kinetic diameter of said hexafluoroethane.

3. The method of claim 1, wherein said first adsorbent is carbon molecular sieve adsorbent, zeolite 4A, zeolite 5A.

4. A method of processing semiconductor manufacturing exhaust gases for recovering at least hexafluoroethane, said method comprising:

introducing a feed stream originating from a semiconductor processing chamber to an adsorbent bed, said feed stream made-up of said semiconductor manufacturing exhaust gases and comprising oxygen, nitrogen, and said hexafluoroethane; and discharging a product stream from said adsorbent bed;

the adsorbent bed containing at least a first adsorbent and a second adsorbent;

said first adsorbent selected to have a comparable capacity to adsorb said nitrogen and said oxygen and a slower rate of adsorption for said nitrogen than said oxygen, and to substantially not adsorb said hexafluoroethane such that said product stream has a higher concentration of said hexafluoroethane than said feed stream;

said second adsorbent having a higher capacity to adsorb said nitrogen than said oxygen and a comparable rate of adsorption for said nitrogen and said oxygen; and said first adsorbent has a higher capacity to adsorb said oxygen than the second adsorbent and said first and second adsorbents having comparable rates of adsorption for said oxygen;

whereby said first adsorbent primarily adsorbs said oxygen and said second adsorbent primarily adsorbs said nitrogen.

5. The method of claim 4, wherein:

said exhaust gases further comprise carbon tetrafluoride; and said adsorbent bed also has a third adsorbent having pore sizes greater than another kinetic diameter associated with said carbon tetrafluoride so that carbon tetrafluoride is adsorbed therein.

6. The method of claim 5, wherein said third adsorbent is a 5A zeolite or carbon molecular sieve.

7. The method of claim 4 or claim 5, wherein said semiconductor manufacturing exhaust gases has a higher concentration of oxygen and said feed stream is first passed through said first and than the second of said adsorbents.

8. The method of claim 4 or claim 5, wherein said first adsorbent is carbon molecular sieve adsorbent and said second adsorbent is a zeolite adsorbent.

9. The method of claim 1, claim 2, claim 4, or claim 5 wherein:

said exhaust gases further comprise moisture and said adsorbent bed further has a layer of silica gel or alumina to adsorb said moisture.

10. The method of claim 1, or claim 2, or claim 4, or claim 5, wherein:

said method employs a plurality of said adsorbent beds; and said method is conducted by subjecting said plurality of said adsorbent beds to an out of phase cycle comprising subjecting each of said adsorbent beds to a production phase by introducing said stream of said mixture therein followed by a regeneration phase to desorb said nitrogen and said oxygen from said two adsorbents and to repressurize each of said absorbent beds to a pressure of said stream of said mixture.

11. The method of claim 10, wherein said out of phase cycle is a pressure swing adsorption cycle.

12. The method of claim 10, wherein:

during said production phase, said feed stream is compressed to an operational pressure of said cycle; and said regeneration phase includes:

at least one first pressure equalization step in which pressure within each of said beds decreases from said operational pressure;

a vent step in which said pressure further decreases;

an evacuation step in which said pressure still further decreases to below atmospheric pressure;

at least one second pressure equalization step in which said pressure increases from said below atmospheric pressure; and a backfill step in which each of said beds is backfilled with part of said product stream so that said pressure is brought up to said operational pressure.

13. The method of claim 12, wherein:

said cycle is conducted with four of said adsorbent beds; and there are two of said first pressure equalization steps and three of said second pressure equalization steps.

* * * * *